Sept. 1, 1970   E. UHLMANN ET AL   3,526,780
POWER TRANSMISSION PLANT FOR HIGH VOLTAGE DIRECT CURRENT
Filed May 25, 1967   6 Sheets-Sheet 1

INVENTOR.
ERICH UHLMANN
PER DANFORS
BY
Jennings Bailey Jr

I    II    III    IV

Sept. 1, 1970   E. UHLMANN ET AL   3,526,780
POWER TRANSMISSION PLANT FOR HIGH VOLTAGE DIRECT CURRENT
Filed May 25, 1967   6 Sheets-Sheet 6
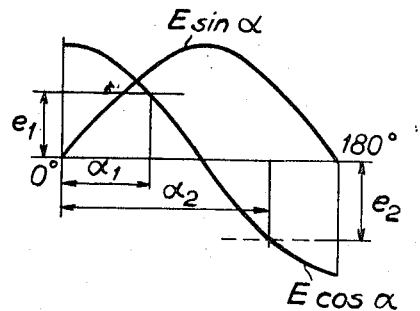
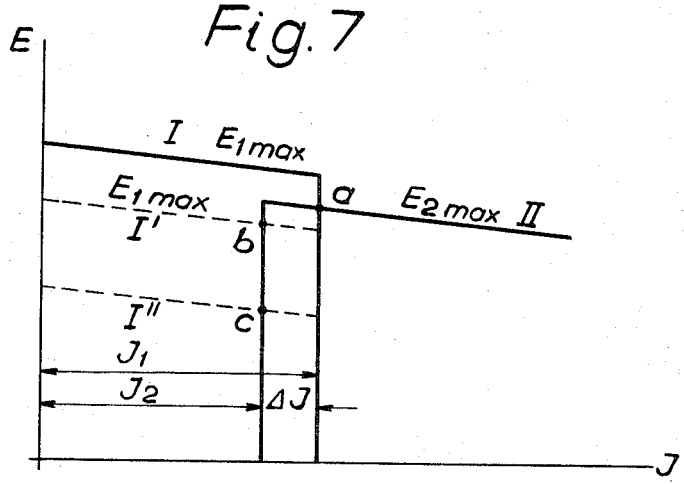
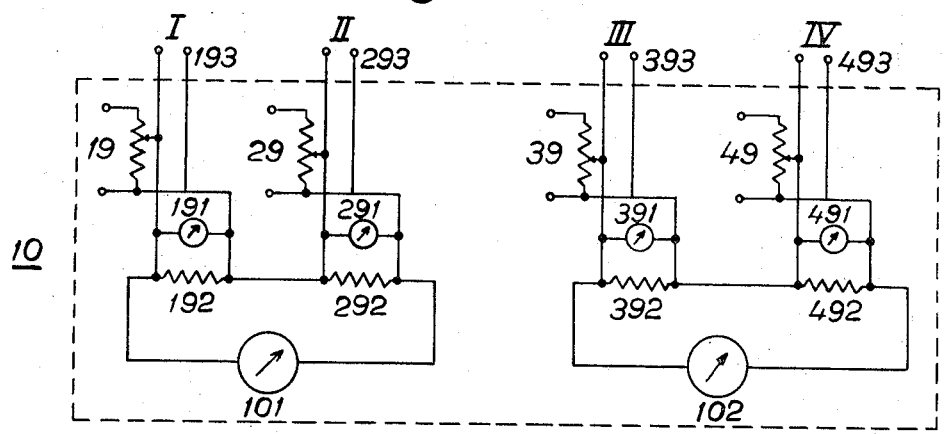
INVENTOR.
ERICH UHLMANN AND
PER DANFORS
BY
Bailey, Stephens + Huetta

United States Patent Office 3,526,780
Patented Sept. 1, 1970

3,526,780
POWER TRANSMISSION PLANT FOR HIGH VOLTAGE DIRECT CURRENT
Erich Uhlmann and Per Danfors, Ludvika, Sweden, assignors to Allmänna Svenska Elektriska Aktiebolaget, Västerås, Sweden, a Swedish corporation
Continuation-in-part of application Ser. No. 340,352, Jan. 27, 1964. This application May 25, 1967, Ser. No. 641,180
Claims priority, application Sweden, Jan. 30, 1963, 987/63; Mar. 25, 1963, 3,213/63
Int. Cl. H02m 3/32
U.S. Cl. 307—82                          12 Claims

ABSTRACT OF THE DISCLOSURE

An HVDC power transmission system has at least three static converter stations connected on their A.C. sides to A.C. networks and on their D.C. sides to two D.C. conductors. The stations include an inverter station and a rectifier station reverse parallel connected. A delay angle control means in each station is controlled by a settable current regulator. The total current setting of all the parallel connected rectifier stations exceeds the total current setting of all the inverter stations.

PRIOR APPLICATIONS

This application is a continuation-in-part of application S.N. 340,352, filed Jan. 27, 1964, now abandoned.

FIELD OF THE INVENTION

Background of the invention

The present invention relates to a power transmission plant for high voltage direct current, comprising more than two converter stations.

Prior art

Power transmission plants with high voltage direct current between the points are nowadays generally known and several such installations have already been built. In considering the control of such an installation, it must be borne in mind that the control possibilities in a converter consist partly of a variation in delay angle for the rectifiers of the converter and partly of a variation in the alternating voltage connected to the rectifiers, which variation, for example, may be obtained with the help of tap selectors in the converter transformer. Said controls make it possible to vary the EMF of the converter from zero to a value corresponding to the rectified value of the alternating voltage connected to the converter and, by varying the EMF of both converter stations, it is possible to vary the different transmission magnitudes in the plant. Further it is possible to control the delay angle and, for example, the tap selectors of the converter transformers depending on the desired value of one or several of the transmission plant operating variables such as current, voltage, power, frequency, etc. When controlling such a plant it is convenient in one of the converter stations to control one of the variables, current, voltage, power, or the like, in the transmission and in the other to determine a second of these variables and this is often done by providing each station with a current regulator, which regulators are set so that the current setting of the rectifier station exceeds the current setting of the inverter station by a certain quantity, the so-called current margin. Depending on the setting of the two stations, the grid control of the rectifiers in one station will be set with respect to the current set in the current regulator of the station, while in the other station the current regulator tends to set a current corresponding to the current setting of this regulator. Since, however, the current must be the same in both stations, the current demand made by the current regulator in the last mentioned station cannot be fulfilled and the grid control in this station will thus increase the EMF of the station to the highest possible value, which means that in a rectifier station the delay angle is set at the least possible value, for example zero, while in an inverter the control is driven towards the least permissible margin of commutation. Often, however, both with rectification and with inversion the delay angle is under normal conditions further limited in order to have a certain control reserve. In this way the direct voltage in the station in question will permanently correspond to the voltage in the alternating current network connected to the station, and the EMF of this station will determine the direct voltage of the transmission. If, as is sometimes the case, the transmission operates with a certain desired transmitted power or in relation to another desired transmission variable, the transmission current can be derived as a function of the desired transmission power and the existing transmission voltage, so that it is always possible to control a direct current transmission between two points in such a way that one converter station determines the direct voltage of the transmission and the other its direct current.

Thus, while it is convenient with such a transmission comprising two current converters to let the one station determine the direct voltage of the transmission and the other its direct current, it is not quite evident as to how the control should be divided in those cases where a transmission comprises more than two converter stations. Depending upon the number of converter stations, a certain number of different combinations is possible in dividing the control, and each of these possibilities demands a thorough analysis for a decision to be made as to whether such a control division is usable or not. Hitherto this problem seems to have been prohibitive for the building of an HVDC-transmission plant with more than two stations.

SUMMARY OF THE INVENTION

According to the present invention it is proposed to let one of the converter stations determine one of the variables, voltage, current, power, or the like, in the plant, while the other stations are arranged to individually determine another of said variables.

The converter stations may be connected either in series or in parallel and an analysis shows that the variable which in the case in question is the same in the different stations should be determined by one station. According to the invention, therefore, with series connection one station should determine the current of the plant and the other stations should each determine another variable, for example voltage, whereas if the stations are connected in parallel, one of the stations should determine the voltage of the plant and the others determine another variable. Thus, for example, with parallel-connection one of the other stations may be controlled in relation to a certain desired current and another with relation to a certain desired power, although it is usually simplest if the large group of stations is controlled in relation to the same variable. As however the demands for a certain transmitted power or other transmission variables always can be expressed by the two parameters voltage and current, said two parameters will be preferred in the following in order to simplify the description.

A general comparison between the two possibilities shows that series-connection has the advantage that transfer from rectifying to inverting or vice versa in a converter station takes place by simple conversion, while when the stations are parallel-connected a station which is to be changed from rectifying to inverting or vice versa must be reversed in polarity by disconnection and subsequent connection with reversed polarity. A converter station intended for alternatively rectifying and inverting may be provided with two rectifier groups in so-called cross-connection, which is however rather expensive.

An advantage with parallel operation is, however, that the voltage is the same everywhere on the line apart from the voltage drop in the cable, whereas with series operation the voltage is different in the different sections of the line and dependent on the distribution of rectifiers and inverters. With a large number of successive converter stations of the same type, the voltage with series connection will be very high, thus requiring superior insulation which may put the competitive possibilities of direct current transmission at a disadvantage in comparison with alternating current transmission.

A further development of the invention, which can in principle be utilized with both series and parallel-connected stations, relates preferably to parallel-connected converter stations and is based on a somewhat altered method of viewing the problem, by which certain simplifications in the whole control system have been achieved. As previously mentioned, one of the regulating possibilities in a station consists in regulating the delay angle of the station and therewith its voltage in relation to the line voltage with the help of the grid control of the rectifiers, and this possibility with rectifiers is limited by the delay angle zero and with inverters by the least possible margin of commutation. At this limit, with a given alternating voltage on the alternating voltage side of the converter, the maximum EMF of the station is obtained. Normally, however, limits are chosen for the delay angle which with rectifiers correspond to a delay angle greater than zero and with inverters to a margin of commutation greater than the least permissible. Such chosen limits for the phase angle, which have long been known when transmitting with two stations, give a certain limitation in the maximum EMF of the station, but at the same time a certain control reserve which can be utilized in certain instances.

Instead of dividing the control where the stations are connected in parallel into voltage and current control it is possible in a known manner to provide the separate stations with a current regulator and set the current regulators in all the different stations in such a way that the sum of all the rectifier station current settings exceeds the sum of all the inverter station current settings by a certain amount, the so-called current margin. In this way the direct voltage of the transmission will be determined by the station whose maximum EMF is least and the actual current in this station will digress from the current setting of the station by an amount which is equal to the predetermined current margin.

With this arrangement it is of no consequence whether the current setting is made directly, that is, corresponding to a certain desired current, or whether it is derived as a function of a setting of a certain desired power or other transmission variable. To be able to co-ordinate the control of the separate stations, the transmission installation should be provided with a main control system for addition and comparison of the different current settings.

It should be pointed out that a high voltage direct current transmission with a control system having the above described qualities can be made extremely flexible thanks to the asynchronous communication between the different AC systems. These may therefore be regulated completely individually so that one of the networks for example may be regulated in relation to constant frequency, another to constant power, and so on. The power to each network can be regulated in an arbitrary manner and the whole co-ordinated through the main control system.

Said main control system should be arranged to measure and control the A.C. voltages at a point between the rectifiers and transformers of the converter stations, the main control system ensuring a desired transmission direct voltage and determining which station is to be voltage controlling. The main control system should in other words determine at every moment the mutual relation between the EMF of the different stations and the absolute magnitude in the smallest of them. Such control may for example be carried out by means of tap selectors on the converter transformers or by voltage regulation of an AC machine connected to a station.

The novelty of the invention is that at least three stations are connected together and at least one of these stations must be a rectifier station while at least one other must be an inverter station. For a rather long time it was regarded that this might be possible but the question was how? Should the stations be built in a special way or could normal stations be used? The idea of the invention is that each station is constructed in a conventional way, the innovation lying in the control principles for the stations.

For parallel connected stations this principle is in the first place that the regulators of the rectifier stations are preset with a current setting exceeding the current setting of the regulators of the inverter stations by the current margin. According to this principle, stable conditions are obtained in the transmission plant so that the operation of three or more connected stations can be carried out. The next step is the presetting of a voltage margin between one of the stations and all the others. With parallel connection said voltage margin should be set so that the maximum voltage of the proper station is less than that of all the other stations. In this way the voltage determining station is selected in just the same way as with only two stations (for parallel connected stations).

With series connection the above principle simply is transferred according to the normal relations between series and parallel connection.

BRIEF DESCRIPTION OF THE DRAWINGS

The invention will be further described with reference to the drawing where FIG. 1 shows an example of parallel connection of a number of converter stations while FIGS. 2a, 2b, 3a, 3b, 3c, 4a and 4b show current-voltage characteristics for the four parallel-connected converter stations I–IV in FIG. 1 under different operating conditions. Thus, FIG. 2 shows two different cases with all four stations in normal operation, while In FIGS. 2–4 it has been presumed that stations I and II operate as rectifiers while stations III and IV operate as inverters. FIGS. 6 and 7 are explanatory diagrams. FIG. 8 shows a control system according to the invention.

DESCRIPTION OF THE PREFERRED EMBODIMENTS

Figure 1:
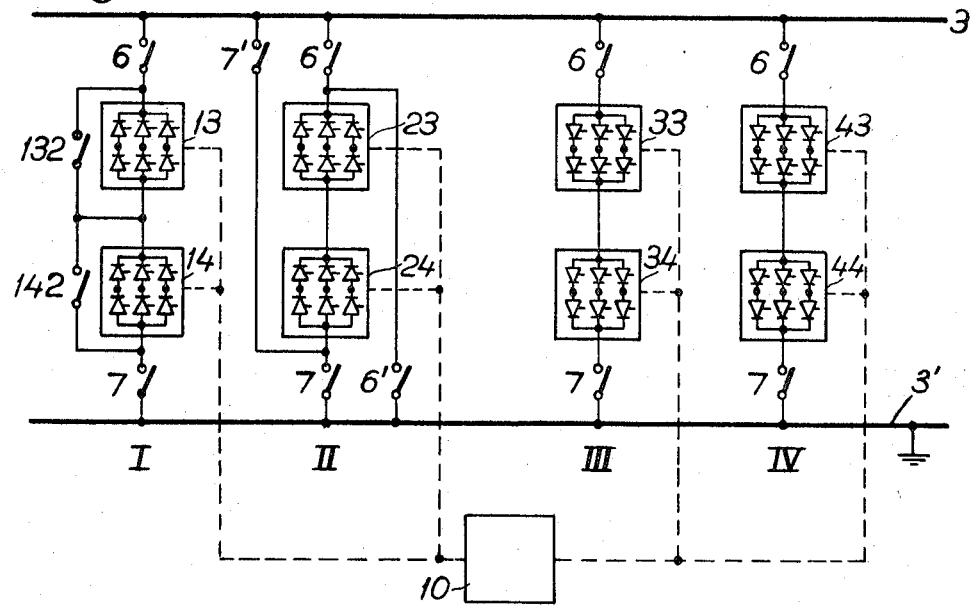

FIG. 1 shows four converter stations I–IV arranged in parallel between two DC conductors one of which is shown at 3 and the other of which may comprise an earth connection for the separate stations. In the figure two stations operate as rectifiers and two stations as inverters, but this distribution may be arbitrarily varied, as long as at least one station operates as a rectifier and one as an inverter. The different stations are connected to DC conductors by means of isolating switches 6 and 7. It would be possible to use breakers but these are considerably more expensive and, as will be clear from the following, one of the advantages of the system according to the invention is that all connections and disconnections of stations can be done in a completely satisfactory manner with the help of isolating switches. In station II an extra pair of isolating switches 6', 7' is also provided to connect the station with reversed polarity. Further, each station is formed of two series-connected converters 13–43 and 14–44 and in station I it is shown how each converter can be by-pass connected by means of short-circuiting members 132 and 142. Normally all stations should be provided with by-pass members for the separate converters whereas the necessity of double isolating switches 6, 7 and 6′, 7′ for polarity reversal during transfer from rectifier operation to inverter operation and vice versa may be different stations and installations. Each station comprises two current converters connected in series and symbolized by their rectifier bridges which are the active parts of a converter. All the converters, however, are built up as shown in more detail in FIGS. 1a and 1b.

Figure 1A:
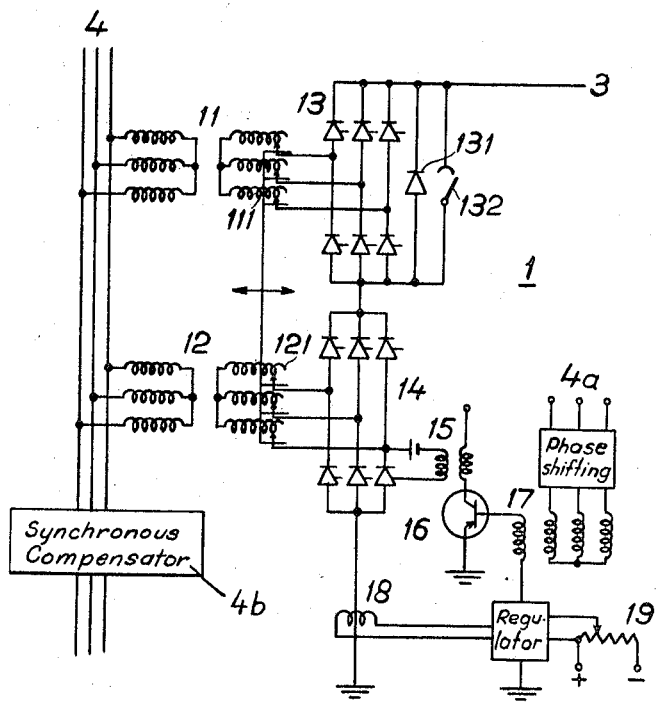
FIGS. 1a and 1b show a conventional HVDC transmission plant between two A.C. networks 4 and 5.
Figure 1B:
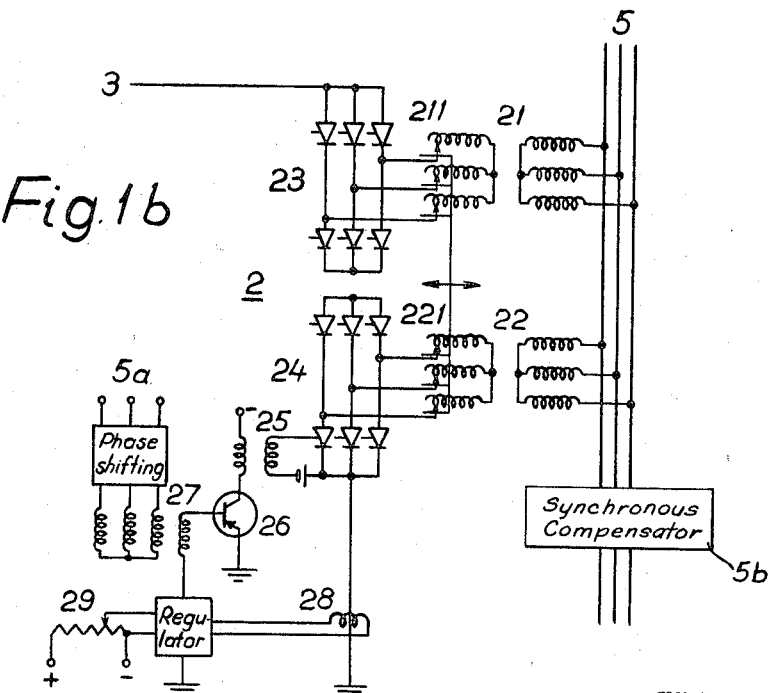

Referring to FIGS. 1a and 1b, the conventional transmission comprises two converter stations 1 and 2, each connected to its corresponding network 4 and 5 and connected with each other over a D.C. conductor 3 and ground. Each station comprises two static converters each comprising a converter transformer 11, 12, 21, 22 and a rectifier bridge 13, 14, 23, 24. For the sake of simplicity the rectifiers are shown as controlled metal rectifiers, although mercury rectifiers are generally preferred for high voltage.

The converters can be controlled in two different ways, namely, on the A.C. side by means of tap selectors on the rectifier windings of the converter transformers and by means of delay angle control means for the rectifiers.

As the two converter transformers of a station are connected in parallel to the corresponding A.C. network, their tap selectors suitably are controlled synchronously, which control may be carried out manually or automatically.

In each station the delay angle control means is shown for one of the rectifiers. In station S1, for instance, this means comprises a grid voltage transformer 15, the secondary side of which is connected in series with a bias voltage source to the control electrode of the rectifier. The bias voltage source is so directed that it gives a negative blocking potential to the control electrode. The primary side of the grid voltage transformer is connected to a negative voltage source in series with a transistor 16. To the base electrode of the transistor is connected an A.C. reference voltage and a direct control voltage. The A.C. reference voltage is taken from one phase of a transformer 17 connected to a phase shifting device with terminals 4a which in their turn are connected to the network 4 through a voltage transformer not shown.

The direct control voltage is taken from a regulator formed like a current regulator with two inputs. One of the inputs is connected to a measuring transductor 18 for measuring the actual transmission current in the D.C. conductor 3. The other input is connected to a potentiometer 19 by means of which a predetermined direct current value is preset for the station. In dependence on these two input magnitudes, the regulator will give an output direct voltage $e_1$, the value of which is described with reference to FIG. 6.

Figure 2:
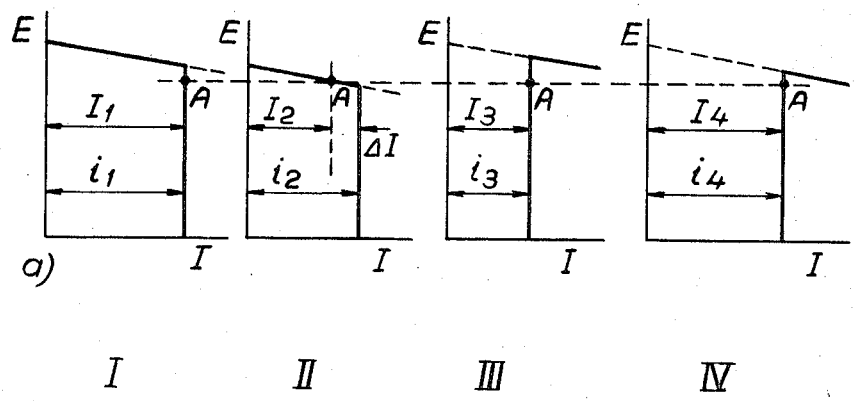
Figure 2:
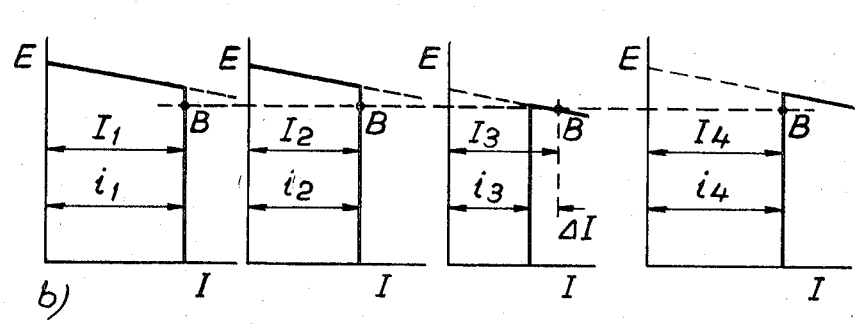

The rectifier in question, together with the two others connected in parallel with it, forms a commutation group so that each rectifier bridge comprises two commutation groups each comprising three rectifiers. The three rectifiers of a commutation group are connected each to its own phase of the corresponding converter transformer. Two phase voltages from the converter transformer give together a commutation voltage for the corresponding two rectifiers and in FIG. 2 is shown a half period of such a commutation voltage $E$ sine $\alpha$. During such half period the anode voltage of an igniting rectifier is positive in relation to the anode voltage of the preceding rectifier in the commutation sequence. By means of the phase shifting device a voltage $E \cos \alpha$ is taken out from the corresponding secondary phase of transformer 17 which voltage is phase displaced 90° in relation to the corresponding commutation voltage. This phase voltage $E \cos \alpha$ is connected in series with the direct voltage $e_1$ from the regulator and when the corresponding two voltage curves in FIG. 6 intersect each other the transistor 16 will have negative base potential and become conducting. Because of this, a voltage will be induced in the secondary winding of the transformer 15 which voltage exceeds the bias voltage in series with it so that the corresponding rectifier is ignited with the delay angle $\alpha$. This rectifier will then be conducting until the next rectifier in the commutation sequence is ignited so that in this case the conducting interval of a rectifier will be 120°.

In the same way each rectifier of a station is controlled with its own A.C. reference voltage from the corresponding phase of transformer 17 and a common direct control voltage from the regulator and it is seen that, if the direct control voltage varies between the positive and the negative amplitude value of the A.C. reference voltage $E \cos \alpha$, the delay angle of the rectifiers varies from 0° to 180°. Further, the direct voltage across each static converter and thus also across the whole station will be proportional to such direct control voltage.

In this connection it should be pointed out that a delay angle from 0° to 90° corresponds to rectifier operation, while a delay angle from 90° to 180° corresponds to inverter operation. In inverter operation it should also be pointed out that there must be an active A.C. machine in the corresponding A.C. network, for instance a synchronous compensator 4b or 5b, the A.C. voltage of which is represented by a direct voltage of EMF on the D.C. side or the inverter, said direct voltage being directed opposite to the direct voltage from the feeding D.C. conductor.

The rectifiers in the station S2 are provided with corresponding delay angle control means 25–29, and if the station S1 operates as a rectifier, the station 2 will be an inverter station. If the direct voltages of the two stations are $E_1$ and $E_2$ respectively, the direct transmission current I will be $$I = \frac{E_1 - E_2}{R}$$

where R is the resultant resistance of the whole D.C. circuit.

In order to understand the co-operation between the two stations, reference is made to FIG. 7 showing two knee curves I and II giving voltage current characteristics for the two stations S1 and S2 respectively. The almost horizontal parts of the knee-curves correspond to maximum direct voltage of the proper stations, that is, they correspond to delay angle of 0° or 180° during rectifier or inverter operation respectively, while the vertical parts correspond to the desired transmission current values $I_1$ and $I_2$ for the two stations preset by means of the proper potentiometers 19 and 29 respectively.

It is seen that the preset current value $I_1$ of the rectifier station exceeds that of the inverter station $I_2$ by a certain rather low value $\Delta I$ called the current margin.

When starting the transmission plant, the direct current is zero and the regulator in the rectifier station therefore increases its output voltage $e_1$ to maximum in order to increase the direct voltage $E_1$ of the stations and thus be able to deliver the desired current $I_1$. When the transmission current has passed the value $I_2$ preset in the inverter station, the regulator of this station finds the current too high and increases its output voltage $e_2$ to maximum in order to increase the direct voltage $E_2$ of this station and thus limit the transmission current to the value $I_2$.

The maximum direct voltages of the stations represented by the almost horizontal lines in FIG. 7 can be adjusted by adjusting the A.C. voltages connected to the rectifiers in the stations which A.C. voltages are adjusted by means of the tap selectors shown. In FIG. 7 it is assumed that the rectifier station has a greater maximum voltage than the inverter station. Thus when the regulator of the inverter station has increased the delay angle for the rectifiers of this station to maximum (which as a matter of fact, for the sake of security, normally is limited to about 150°) nothing more can be done from this station. The regulator of the rectifier station adapts the delay angle for the rectifiers of this station to such a value that the direct voltage $E_1$ of this station fulfills the equation $$I_1 = \frac{E_1 - E_2 \text{ max.}}{E}$$

Thus it is seen that the direct voltage of the transmission line will be substantially equal to the maximum voltage $E_2$ max. of the inverter station, while the transmission current will be equal to $I_1$ preset in the rectifier station. Point $a$ in FIG. 7 indicates a stable point of operation of the transmission plant in this case.

In the maximum voltage of the rectifier station is less than that of the inverter station, as indicated by the dotted line $i$ the regulator of the rectifier station will increase the direct voltage of the station to a maximum while the regulator of the inverter station will increase the direct voltage $E_2$ of this station in accordance with the equation $$I_2 = \frac{E_1 \text{ max.} - E_2}{R}$$

so that the direct voltage of the transmission line is now determined by the rectifier station, while the inverter dictates the transmission current. The operating condition of the plant in this case is indicated by the point $b$ in FIG. 7.

As has been mentioned, the maximum direct voltage of each station is adjusted by means of the tap selectors 111, 121, 211, 221 and with a transmission plant with only two stations normally the maximum direct voltage of the rectifier station is adjusted to a higher value than that of the inverter station. In such a plant the knee curve I is of little interest, except in the case of a fault in a converter in the rectifier station. In case of a fault, for instance in the converter 11, 13, in FIG. 1a, the rectifier group 13 is first by-pass connected by a by-pass rectifier 131 and then short-circuited by an isolator 132. In this way the maximum direct voltage of the rectifier station is halved as indicated by the dotted line I'' in FIG. 7 and the operating condition of the plant is indicated by the point $c$.

Thus it is seen that the power transmission can be maintained even in case of a fault in a converter in a station and for this purpose each converter in each station is provided with a by-pass rectifier and a short circuiting isolator corresponding to 131 and 132 respectively in FIG. 1a in order to by-pass a faulty converter.

In the above it was mentioned that the current setting $I_1$ of the rectifier station exceeds that of the inverter station $I_2$ by a certain amount, the current margin $\Delta I$.

If the two stations were preset with the same current value, this current value could be obtained at any arbitrary voltage as the two stations then always could find a control position where the common desired current was obtained. As a matter of fact, the direct voltage of the system then presumably would oscillate slowly or rapidly between maximum voltage and zero. Another drawback with such a control state is that, with small variations of the current setting, $I_1$ could be less than $I_2$ which would cause both stations to reduce their direct voltage to zero so that the power transmission would be interrupted. Thus it is seen that the current margin is necessary for a stable operation of the system.

Further, it has been described how the setting of the maximum direct voltage of the rectifier station could be higher or lower than that of the inverter station. If said maximum direct voltage was the same for the two stations, which means that the horizontal parts of the two knee curves, I and II in FIG. 7 would coincide, the regulators of the stations would increase the voltage of the stations to the maximum and there would be no clear point of intersection between the two characteristics. The transmission current would therefore presumably oscillate between the two values $I_1$ and $I_2$, which of course cannot be tolerated, so that a voltage margin is necessary for a stable operation. It could however be pointed out that the current margin $\Delta I = I_1 - I_2$ must always be positive, while the voltage margin for the sake of stability may have any polarity.

Referring again to FIG. 1, this shows four stations connected between D.C. conductors 3 and 3'. As an example stations I and II correspond to FIG. 1a and stations III and IV to FIG. 1b.

Figure 3:
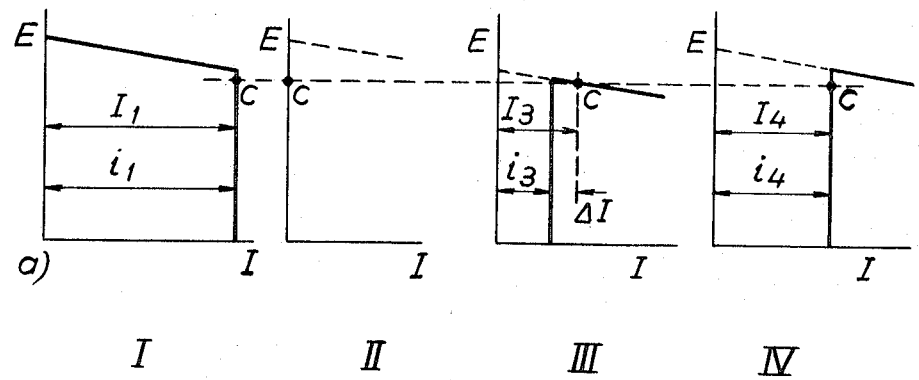
FIGS. 3 and 4 show the circumstances in different switching situations.
Figure 3:
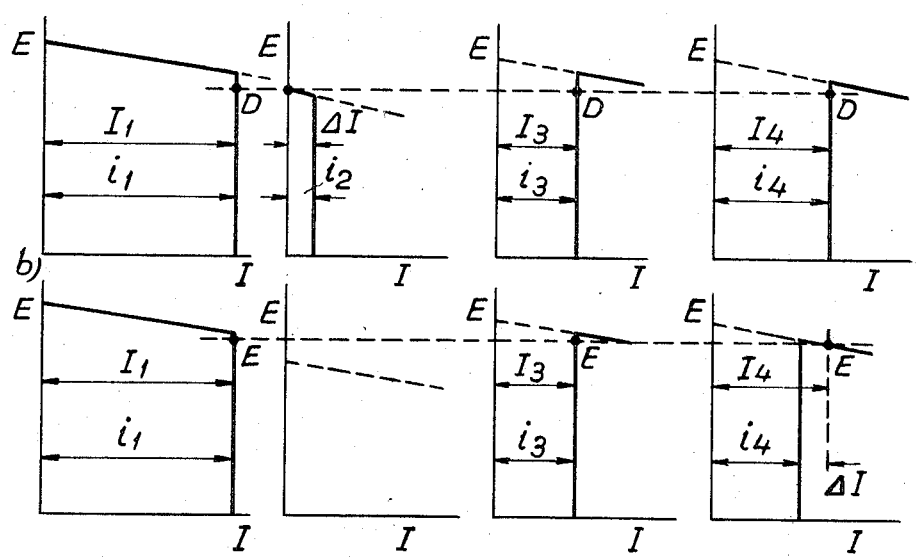
Figure 4:
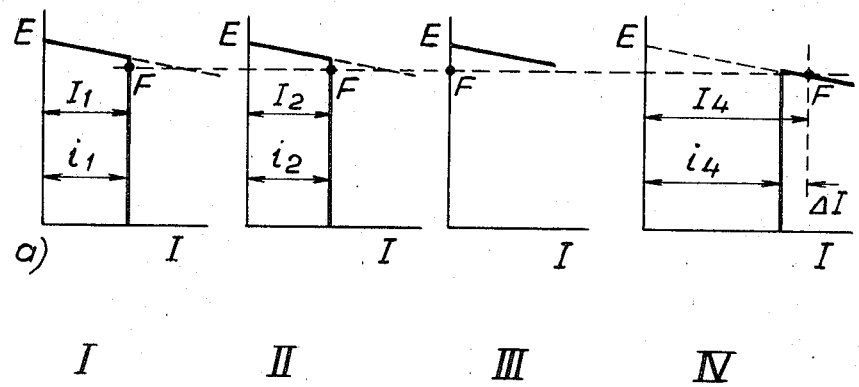
Figure 4:
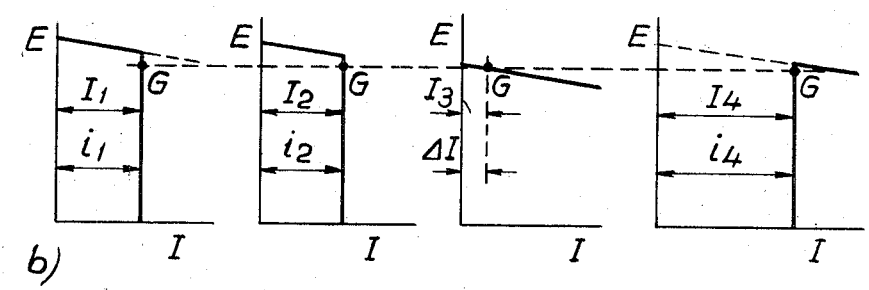

In FIGS. 2–4 the current voltage characteristics for the four converter stations are shown in a known manner, wherein the currents are indicated as abscissae while the voltages constitute ordinates and the sloping lines show the limit values for current and voltage in the different stations. The actual currents are indicated by I while the set currents are indicated by $i$. In the case shown in FIG. 2a it is station II which has the least maximum EMF. Even if this station, which is operating as a rectifier, increases its voltage to the maximum by reducing its phase angle to zero or a predetermined limit value, the current $i_2$ set in the current regulator cannot be reached in the station, but the current $I_2$ in this station will become the difference between the sum of the currents in inverter stations III and IV and the current in rectifier station I, said stations having greater maximum EMF so that they will increase their EMF until the preset current is obtained in each station. However, it will be the station II which will determine the direct voltage of the transmission, which voltage is indicated by A. In the stations I, III and IV the actual current I will be equal to the set current $i$ while in station II the actual current $I_2$ digresses from the set current $i_2$ by the current margin $\Delta I$.

In FIG. 2b is shown the case where an inverter station, namely station III, has the least maximum EMF. Also in this case the regulator in the station tries to increase the maximum EMF of the station by tending to shift the delay angle of the station in the direction of the least permissible margin of commutating. In this case station III will determine the direct voltage B of the transmission, while its current $I_3$ will be the difference between the currents in the other rectifier and inverter stations The actual current of the station will exceed the set current $i_3$ by the current margin $\Delta I$.

Alteration of the current setting in one station causes different consequences depending on whether the station is operating as a rectifier or an inverter and whether it is voltage determining or current determining.

Simplest is the case of an increase of the current order in a rectifier station or a decrease of the current order in an inverter station. If the station in question is voltage determining it is clear that such an alteration will have no consequences whatever since a voltage determining rectifier is in any case unable to increase its current and a voltage determining inverter is unable to decrease its current. If it is a question of a current determining station the voltage determining station will receive the alteration in such a way that a voltage determining rectifier station will carry even less current while a voltage determining inverter station will carry more current.

If, on the other hand, the current order is increased in an inverter or decreased in a rectifier, this will always influence the current in the voltage determining converter station and, if the actual current alteration is not as large as the current margin but still closely approaches this margin, it is seen that minor alterations in the system very easily bring about the previously mentioned unbalance.

In order to prevent such cases it is necessary to ensure that an alteration of current order setting in a converter station, which would decrease the pre-set current margin of the plant, is preceded by a corresponding current order alteration in at least one of the other stations. In this way it is ensured that a certain least permissible current margin always exists in the voltage determining station. Suitably a programme should be decided on in advance as to how the alteration in current setting in a given converter station is to be compensated from the other converter station.

If for some reason the voltage in a converter station suddenly alters, for example due to alterations in the load on the AC side of the converter or to faults in some of the partial converters in the station, the following possibilities may arise.

In the event of a voltage drop in a voltage determining station this will simply cause the current controlling stations to alter their EMF until the currents have adjusted themselves to the desired magnitude. If the EMF of a current controlling station increases this will cause the current of the station to increase if it is operating as a rectifier and decrease if it is operating as an inverter. The current regulator will thus influence the grid control of the station and alter the delay angle and therewith the EMF of the station until the desired current has been restored.

In the event of a voltage drop in a current controlling station, smaller alterations will be compensated by alterations in the delay angle of the station, but with major alterations the control will very soon reach its upper limit, which with a rectifier is the delay angle zero while with an inverter it is the least permissible margin of commutating, and the station therefore is transferred from being current controlling to being voltage determining. Simultaneously the current margin set in the previously voltage determining station will be made use of and this station be transferred from being voltage determining to being current controlled.

If the voltage increases in a voltage determining converter station, this case will be almost equivalent to the previous one. The whole line voltage will hereby increase and in order to maintain the desired currents the other stations will increase their voltages correspondingly. At a certain moment however these stations will reach their upper limit and change over to being voltage determining. Thereafter the previously voltage determining station will alter its current until the current margin is exceeded, after which this station will change over to being current determining. This can be seen as if the current margin is transferred to all the other stations, which thus become voltage determining. However, it is rather difficult in a parallel-connected system to obtain good balance and suitable current distribution under such conditions so that it is desirable that it is in some way predetermined which of the other stations is to become voltage determining.

As is clear from the foregoing, it is very important that the current setting in the different stations is always correct and at the same time it is desirable that possible alterations in the set control magnitudes and control programme occur in a certain sequence following definite rules, so that a power transmission with more than two converter stations is suitably provided with a main control system 10, which determines current and voltages in the plant and in which are stored the desired distributions for the different operations. Since therefore many combinations may occur such a main control system is suitably made in the form of a data machine, punch card equipment or the like of known type.

As previously mentioned a fault in a partial converter in one station will cause a drop in the voltage of this station. If in this case the station is of less importance it is simply possible to disconnect the station, and if it is a rectifier station a corresponding current alteration in another station must be introduced. If the station is voltage determining it must first be transferred to being current controlling and the voltage control transferred to another station. If, however, it is a question of a station which it is important to keep in operation, the whole voltage of the transmission may simply be decreased. Even such eventualities should be considered in advance and corresponding orders can suitably be stored in the above mentioned main control system 10.

Thus it is seen that the main control system 10 simply forms a remote control central for the different stations. As mentioned above the two essential control parameters for a station are voltage and current. Regarding the voltage control, this is accomplished by means of A.C. voltage control means, for instance tap selectors on the converter transformers of the station. For this purpose there must be a two-way signal link between the main control system and each station so that the tap selectors of each station are provided with a control signal while the station is provided with a measuring transformer on the A.C. side of the rectifiers of the station, from which measuring transformer the actual value of said A.C. voltage is sent back to voltmeters in the main control system. In this way the A.C. voltages of the different stations can ben adjusted from the main control system either manually or automatically according to predetermined control programmes.

For the purpose of a remote current setting in the different stations, the current setting potentiometers corresponding to 19 and 29 shown in FIGS. 1a and 1b could suitably be arranged in the main control system 10 as shown in FIG. 8. In this figure is shown a current setting potentiometer 19, 29, 39, 49, for each station. Each potentiometer is provided with output terminals 193, 293, 393, 493 connected for instance through radio links to the regulators of the proper stations. The output signals from the potentiometers are indicated on voltmeters 191, 291, 391, 491. Further said signals are connected to resistors 192, 292, 392, 492, and all resistors corresponding to rectifier stations are connected in series and connected to a further voltmeter 101 while all resistors corresponding to inverter stations in the same way are connected to another voltmeter 102. Said two voltmeters then indicate the total current settings for the two groups of converter stations and by setting the current setting potentiometers in the right way the necessary current margin can always be secured.

Connection and disconnection of a rectifier station is done with blocked rectifier groups in the station. After connection the station is unblocked and the voltage and thus the current is brought up to the desired value. Upon disconnection the current is brought to zero, the rectifier groups are blocked and the isolating switches open.

Connection and disconnection of an inverter station during normal operation is done, however, with unblocked rectifier groups. The voltage of the station is set so that the current of the station is zero and the isolating switches are opened or closed at zero current.

Only upon a fault in an inverter station, whereby its voltage drops below normal voltage, must the voltage of the transmission be decreased to at least the same level as the inverter station voltage so that the current in the station becomes zero. Often it may be found suitable to make the whole plant voltageless since such an operation can be carried out very rapidly by converting the rectifier stations to inverter operation.

According to the invention it is thus possible to connect and disconnect the stations with the use of normal isolating switches. With the idea in mind of being able to rapidly reconnect a station after disconnection due to a fault, it may however be advisable to use rapid isolators.

As mentioned above (see the disclosure to FIGS. 1a, 1b and 6) a rectifier station can be transferred to inverter operation simply by shifting the polarity of the regulator voltage. After this no power is fed to the transmission line and power stored in the line will be absorbed by the station and fed back to the A.C. networks, so that the whole plant is very soon voltage-and currentless.

The conditions when disconnecting a rectifier station are indicated in FIG. 3, where FIG. 3a shows the situation when station II is to be disconnected, while station III has the least maximum EMF and is therefore voltage determining. The direct voltage has the value C. The current in station II is brought down to zero at the same time as the current in station I is increased in a corresponding manner or the current in station IV is decreased. When the current in station II has become zero the rectifiers of the station can be blocked and the station disconnected with the aid of its isolating switches. In FIG. 3b has been shown the situation when station II which is to be disconnected has the least maximum EMF. In this case the station will carry the current zero if its current order $i_2$ is equal to or less than the current margin $\Delta I$. Even if the station now carries no current it can thus still be voltage determining. At the same time as the current order $i_2$ is altered to zero the current order is altered in another station, in the case shown station IV, in a corresponding manner. When the alteration in current order in the stations has been completed the station which has the least EMF of those remaining, in the shown case station IV, will become voltage determining as indicated in FIG. 3c and station II can be blocked and disconnected. The line voltage has thus been altered from D to E.

Disconnection of an inverter station has been illustrated in FIGS. 4a and 4b where the disconnection of station III is shown. In FIG. 4a it is station IV which has the least maximum EMF and station III can therefore be simply brought down to zero current and blocked and disconnected. The line voltage will thus remain unchanged at the value F. In FIG. 4b it is station III which has the least maximum EMF. In this case the station will still carry a current $I_3$ equal to the current margin $\Delta I$, even after it has received the current order zero. It is thus impossible to disconnect this station. In order to make the current in the station zero either the EMF of the station must be increased by increasing its alternating voltage, for example with the aid of tap selectors on the converter transformer, or the voltage must be decreased in another station in a corresponding manner. After this operation the station which now has the least maximum EMF will take over the voltage control, station III will be currentless and can be blocked and disconnected. The described operations for connecting and disconnecting converter stations may suitably be carried out in accordance with programmes stored in a main control system.

Such programmes simply comprise combinations of voltage orders of the setting of the A.C. voltage regulating means of the different stations. Said combinations of voltage orders could be made as lists for the operation staff at the main control point or they can be stored in memories, for instance punch cards, for direct supply to said regulating means.

In order to be able to increase the alternating voltage of an inverter station as described above, and thus its EMF, it is essential that the converter station as well as the AC network connected to it is fault-free. When disconnecting an inverter station due to a fault it is therefore impossible to increase its EMF and the voltage must instead be decreased in one or more of the other stations to bring the current to zero in the station in question.

It is often simpler and more convenient, therefore, to change all the stations over to inversion and thus make the transmission completely currentless, disconnect the damaged station or the damaged part of the network and thereafter increase the voltage and current in the remaining parts of the transmission.

With rapid isolating switches such an operation can be carried out as rapidly as a short-circuiting current can be broken in an AC network. Further, in a DC transmission the time limits are not so narrow for the different operations as in an AC network since with direct current there are no problems of synchronisation during reconnection.

In conclusion it may be stated that all connections and disconnections of stations in or parts of a DC power transmission according to the invention may be carried out with rapid isolating switches without the help of DC breakers.

When there is a fault in a converter in a rectifier station the converter will be blocked and by-passed and, if the fault then disappears, after about 0.5 second, be reconnected. Occasional commutation faults in an inverter disappear normally in a short time and no special precautions need be taken.

When a fault in a converter continues it may be chosen either to disconnect the station in question according to the above described principles, or the station may be allowed to continue operating with a reduced voltage, whereby the station will cause a lower voltage in the whole transmission.

In the event of line faults on the D.C. transmission line the rectifier stations will decrease their voltages in order to reduce the current in the transmission and the inverter stations will decrease their voltages in order to maintain the desired current. This course will continue until the fault current is equal to the current margin and the voltage of the transmission will thereby become very low. In order to make the fault current zero the main control system suitably is arranged to transfer all stations to inversion upon great voltage drops whereby the current very rapidly will be zero in the whole transmission.

Minor faults in an AC network connected to a station need not give rise to disconnection of the station if its auxiliary voltages are intact. Upon permanent major faults in an AC network the corresponding converter station should be disconnected from the D.C. network according to the method described above.

Figure 5:
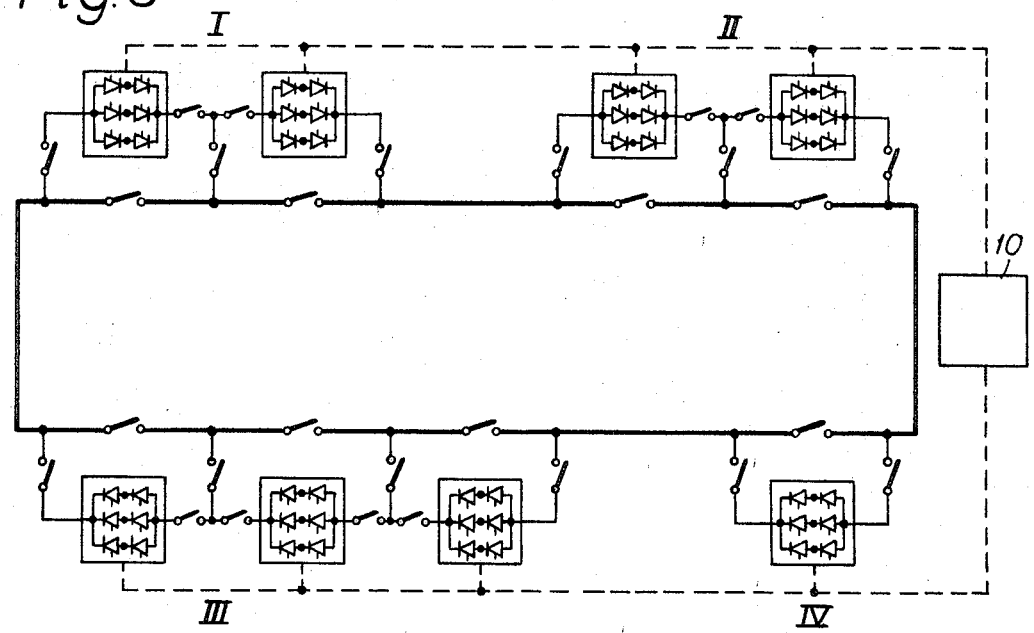
FIG. 5 shows an example of a series connection of converter stations.

In FIG. 5 an example is shown of a transmission plant where all four converter stations I–IV are connected in series. While with parallel-connection the currents in the different stations may be different, with series connection they must be alike in all stations, but the voltages may be different as illustrated through different numbers of partial converters in the different stations. The converters are only symbolized by their rectifier bridges, but are built up as shown in FIGS. 1a and 1b. The conditions with this connection are the reverse of those with parallel connection for the converters but in other respects completely analogous with these, and co-ordination of the control in the different stations is also in this case suitably done with the help of a main control system 10.

The relations in the case of series connected stations are most simply understood if the converters of all rectifier stations are regarded together as only one rectifier station, while the converters of all the inverter stations are taken together in the same way. The whole plant may then be regarded as a power transmission system with only two stations as shown in FIG. 1a and FIG. 1b. Thus all rectifier stations have to be provided with a common current setting and all inverter stations with another common current setting which is somewhat less than that of the rectifier stations. Further, the A.C. voltage regulating means of the different stations have to be preset so that a voltage margin between the total of maximum direct voltages of the two categories of stations is obtained. When these demands are fulfilled a stable operation of the plant is secured. Normally, however, the regulating qualities of a plant with parallel connected stations are better and more flexible than those of a plant with series connected stations so that said last mentioned arrangements preferably are used only for special purposes.

We claim:

1. Method of controlling an HVDC-power transmission plant comprising a D.C. transmission line and at least three converter stations; said transmission line comprising two D.C. conductors, said converter stations being connected in parallel between said D.C. conductors; at least one of said stations being a rectifier station; at least one of said stations being an inverter station; each station being provided with a control system for controlling the delay angle of the rectifiers of the station and with a current control system; said current control system influencing said delay angle control system; the method comprising the steps of setting the current control system of each station to a desired direct current value; keeping the sum of said preset D.C. values of all converter stations in rectifier operation in excess of the corresponding sum for the converter stations in inverter operation by a certain current margin; and controlling the D.C. transmission voltage from the station having the smallest EMF at a predetermined limit for the delay angle.

2. Method as claimed in claim 1; the additional steps of deriving said D.C. value from a reference value for one of the variables of the transmission plant.

3. Method as claimed in claim 1; said transmission plant comprising a main control system; said main control system summing and co-ordinating said preset D.C. values of the different converter stations; the step of setting said current margin in said main control system.

4. Method as claimed in claim 3; the step of controlling through said main control system, according to a predetermined programme the A.C. voltages between the rectifiers and the converter transformers in the different converter stations.

5. Method of controlling an HVDC power transmission system comprising at least three static converter stations; each station being connected on its A.C. side to an A.C. network; direct current conductors connecting all said stations in series on their D.C. sides; at least one of said stations being a rectifier station; at least one other of said stations being an inverter station; each station being provided with A.C. voltage regulating means for controlling the A.C. voltages corresponding to a maximum direct voltage on the D.C. side of each station, the method comprising the steps of setting said A.C. voltage regulating means in each station corresponding to a certain desired maximum voltage on the D.C. side of said station in such a way that the total of the maximum direct voltages of all rectifier stations differs from the total of the maximum direct voltages of all inverter stations by a certain voltage margin.

6. An HVDC power transmission system comprising at least three static converter stations and two D.C. conductors; each station being connected on its A.C. side to an A.C. network; all the stations being connected on their D.C. sides in parallel to each other between said two D.C. conductors; at least one of said stations being a rectifier station, at least one other station being an inverter station; said rectifier stations and said inverter stations being reverse parallel connected in relation to each other; each converter station being provided with delay angle control means for the rectifiers of the station; a current regulator in each station controlling said delay angle control means of the station; each of said current regulators having a current setting input circuit; said current setting input circuit being preset in accordance with a certain desired direct current value for said station; the total of current settings of all said parallel connected rectifier stations exceeding the total of current settings of all said inverter stations by a certain current margin.

7. An HVDC power transmission system as claimed in claim 6; each station being provided with A.C. voltage regulating means for controlling the A.C. voltages connected to the rectifiers of the station; said A.C. voltage regulating means in the different stations being preset according to a predetermined A.C. voltage value; said A.C. voltage regulating means in one of said stations being preset in accordance with an A.C. voltage value which is lower than that in each of the other stations.

8. An HVDC power transmission system as claimed in claim 7; means for remotely controlling said current setting input circuits and said A.C. voltage regulating means of all said stations from a central place; said transmission system comprising at said control place summating means for said current settings of said inverter stations and comparing means for said two summating means for determining said current margin; and comparing means at said central point for comparing the settings of said A.C. voltage regulating means.

9. An HVDC power transmission system as claimed in claim 6; said desired direct current value in at least some of said stations being variable in accordance with a desired reference value for another operating quantity of said station.

10. An HVDC power transmission system comprising at least three static converter stations; each station being connected on its A.C. side to an A.C. network; direct current conductors connecting all said stations in series on their D.C. sides; at least one of said stations being a rectifier station; at least one other of said stations being an inverter station; each station being provided with A.C. voltage regulating means for controlling the A.C. voltages corresponding to a maximum direct voltage on the D.C. side of each station; said A.C. voltage regulating means in each station being preset corresponding to a certain desired maximum direct voltage on the D.C. side of said station; said A.C. voltage regulating means of the different stations being preset in such a way that the total of said maximum direct voltages of all rectifier stations differs from the total of said maximum direct voltages of all inverter stations by a ceratin voltage margin.

11. An HVDC power transmission system as claimed in claim 10, each station being provided with delay angle control means for the rectifiers of the station; a current regulator in each station controlling said delay angle control means; said current regulator having a current setting input circuit; said current setting input circuits of all said inverter stations preset with a common desired current value; said common desired current value of said rectifier stations exceeding said common desired current value of said inverter stations by the current margin.

12. An HVDC power transmission system as claimed in claim 11, means for remotely controlling said A.C. voltage regulating means and said current setting input circuits from a central place; summating means at said central place for said maximum direct voltage of all said rectifier stations and summating means for said maximum direct voltages of all said inverter stations and comparing means for said two summating means for determining said voltage margin, and comparing means at said central place for said two common desired current values for determining said current margin.

References Cited

UNITED STATES PATENTS

| 2,832,029 | 4/1958 | Forssell | 321—2 |
| 3,280,334 | 10/1966 | Uhlmann et al. | 321—2 X |

ORIS L. RADER, Primary Examiner

W. E. DUNCANSON, Jr., Assistant Examiner

U.S. Cl. X.R.

321—2